United States Patent Office 2,723,996
Patented Nov. 15, 1955

2,723,996

N,N,N'-TRIBENZYL-N'-HYDROXY ALKYL ALIPHATIC DIAMINES

Albert F. Strobel, Phillipsburg, N. J., and William Wilson Williams, Easton, Pa., assignors to General Aniline & Film Corporation, New York, N. Y., a corporation of Delaware No Drawing. Application September 12, 1951,
Serial No. 246,332

6 Claims. (Cl. 260—570.9)

This invention relates to tribenzyl derivatives of hydroxy alkyl aliphatic diamines which are particularly useful as gas fading inhibitors for dyeings on cellulose derivatives and in the preparation of spirit-soluble dyestuffs.

United States Patent 2,017,119 discloses as inhibitors for gas fading various aralkylamines. However, due to the large amounts of such compounds which are necessary to inhibit gas fading, and due to the only moderate fastness to washing, dry cleaning, and sublimation of such compounds, they have found little commercial use as inhibitors.

N,N'-diphenylethylenediamine is disclosed in United States Patent 2,416,380. This compound, while permanent, has the marked peculiarity that it tends to develop a color of its own on exposure to gas fumes, as a consequence of which it changes a pastel blue dyeing to a green shade.

There are many requirements which a gas fading inhibitor must meet in order to be acceptable from a practical standpoint. These requirements are as follows:

1. It must prevent fading of the dyed cellulose derivative when exposed to gas.
2. It must be and remain colorless, i. e., introduce no color of its own when exposed to gas. (This criterion, as noted above, is important for pastel dyeings where any color introduced by the inhibitor would effect a marked change in shade.)
3. It must give no discoloration on prolonged exposure to sunlight.
4. It must be fast to dry cleaning and wet washing.
5. It must be fast to sublimation.
6. It must be odorless and non-toxic.
7. It should be suitable for direct dyeing along with the dye in the dye bath. To this end it must exhaust from the dye bath by having a natural affinity for cellulose derivatives and be capable of being suitably emulsified or dispersed in water to assure level dyeing.

When these factors are added up, it is no wonder that the art has been searching so fruitlessly for so many years in order to obtain a gas fading inhibitor which will be eminently satisfactory from a commercial standpoint.

We have now discovered that products which meet all of the above requirements and needs of the art as gas fading inhibitors for dyeings on cellulose esters and ethers and as mediums for the preparation of spirit-soluble dyes from monazo dyestuffs are N,N,N'-tribenzyl-N'-hydroxy alkyl aliphatic diamines.

To provide such compounds constitutes the purpose and object of the present invention.

These compounds are not only useful as gas fading inhibitors on dyeings of cellulose derivatives, but are also excellent for the preparation of spirit-soluble azo dyestuffs.

The compounds contemplated in accordance with the present invention are characterized by the following general formula:

$$\begin{array}{c} H \\ HO-C-CH_2 \\ | \\ R \end{array} \diagdown N-R_1-N \diagup \begin{array}{c} CH_2-Ar \\ \\ CH_2-Ar \end{array}$$
$$Ar-CH_2 \diagup$$

wherein R represents hydrogen or a methyl group, $R_1$ represents an alkylene group of from 2 to 6 carbon atoms, i. e., any aliphatic open-chain linking component, such as ethylene, methylethylene, 1,3-propylene, tetramethylene, pentamethylene, 2-methyl-1,3-propylene, 3,3,3-trimethyl-1,2-propylene, 2,3-butylene, 1,2-dimethylethylene, and the like; and Ar represents a phenyl type radical, i. e., phenyl, alkylphenyl, e. g., tolyl, ethylphenyl, butylphenyl, and the like, halogenophenyl, e. g., chlorophenyl, bromophenyl, dichlorophenyl, dibromophenyl, etc., alkoxyphenyl, e. g., anisyl, ethoxyphenyl, propoxyphenyl, etc., carbalkoxyphenyl, e. g., carbomethoxyphenyl, carbethoxyphenyl, carbopropoxyphenyl, etc., aryloxyphenyl, e. g., phenoxyphenyl, methylphenoxyphenyl, etc., cyanophenyl, etc.

The compounds characterized by the above formula are prepared by reacting a benzyl halide, such as bromide or chloride, with a hydroxy alkyl alkylene diamine of the type:

$$\begin{array}{c} H \quad\quad H \\ HO-C-CH_2-N-R_1-NH_2 \\ | \\ R \end{array}$$

wherein R and $R_1$ have the same values as above.

The hydroxy alkyl alkylene diamines are readily prepared by condensing an alkylene oxide with an excess of alkylene diamine in a pressure vessel, such as an autoclave, at a temperature of about 100° C. In general, the process consists of charging about 5 moles of an alkylene diamine into an autoclave which is then closed and heated to 100° C. and into the autoclave is then pumped, at 15 lb. pressure over a period of 5 hours, a total of 1 mole of alkylene oxide. After all of the alkylene oxide has been added the material is stirred at 100° C. for 1 hour. The end of the condensation reaction is determined when the pressure of the alkylene oxide falls no lower. The pressure vessel is then opened and the material discharged. The product is fractionally distilled through a 16-inch column of glass helices. The first (and major) product distilled is the alkylene diamine. When no more alkylene diamine will distill, the product remaining is essentially a hydroxy alkyl alkylene diamine.

As examples of suitable alkylene diamines and alkylene oxides, which are condensed to yield the hydroxy alkyl alkylene diamines, the following are merely illustrative:

Alkylene diamines:
  Ethylenediamine.
  1,3-propylenediamine.
  Tetramethylenediamine.
  Pentamethylenediamine.
  1,2-propylenediamine.
  2,3-butylenediamine.

Alkylene oxides:
  Ethylene oxide.
  Propylene oxide.
  1,2-butylene oxide.
  2,3-butylene oxide.

In practicing the present invention, the N,N,N'-tribenzyl-N'-hydroxy alkyl aliphatic diamines are prepared as follows:

To a 1 molar benzene solution of the hydroxy alkyl alkylene diamine is added about 0.1 part by volume of water and the two-phase mixture heated to about 60–70° C. Into the mixture is then dripped, through a ½ hour period, ½ mole of a benzyl halide and the temperature maintained between 60–70° C. The material is stirred for 5 hours at the same temperature and after 3 hours, the pH of the reaction mixture is taken by withdrawing a small sample, stirring it with water and measuring the pH with a pH meter. The pH at this stage ranges from 9–10 and after heating for an additional 2 hours, the pH should remain about the same. The material is then cooled to about 40–55° C. and ½ mole of sodium hydroxide pellets added. The mixture is then stirred until the sodium hydroxide dissolves, and the pH measured, which at this stage of the reaction ranges from 10.5 to 12. A second portion of ½ mole of benzyl halide is dripped in over a ½ hour period and the stirring continued until the pH became constant. This requires anywhere from 3 to 3½ hours. A second portion of ½ mole of sodium hydroxide pellets is added and the mixture stirred for an additional ½ hour until all the sodium hydroxide has reacted, with the pH being constant at a value somewhere between 10.5 and 11.5. A third portion of ½ mole of benzyl halide is then added over a 15-minute period and the mixture stirred for an additional 4 hours. A corresponding third portion of sodium hydroxide pellets is then added, the mixture stirred for additional 2 hours until the pH becomes 10 to 10.8. A fourth portion of benzyl halide is added over a 15-minute period and the mixture heated for an additional 4 hours. An addition of ½ mole of sodium hydroxide pellets is then made over a 20-minute period and the mixture stirred for an additional hour until the pH remains constant, ranging at a value between 10 to 10.8. A fifth portion of ½ mole of benzyl halide is added over a 1-hour period at 60° C. and the mixture stirred for an additional 4 hours. When the pH of the withdrawn aliquots become constant, there is then added ½ mole of sodium hydroxide pellets. After the sodium hydroxide pellets have dissolved, which requires from ½ to 1 hour, a final portion of ½ mole of benzyl halide is dripped in over a 2-hour period and the mixture stirred for 5–7 hours. At this point, the reaction is complete and it is then neutralized with aqueous caustic of 40% concentration. The benzene solution is then treated with water and the layer separated. The benzene is then distilled from the product leaving as the residue the desired N,N,N'-tribenzyl-N'-hydroxy alkyl aliphatic diamines.

The benzyl halide, i. e., bromide or chloride, which is reacted with the hydroxy alkyl alkylene diamine is either substituted or unsubstituted, such as, for example:

Benzyl chloride or bromide.
3-methylbenzyl chloride or bromide
2,4-dimethyl chloride or bromide
3,4-dimethyl chloride or bromide
3,5-dimethyl chloride or bromide
5-chlorobenzyl chloride or bromide
o-Bromobenzyl chloride or bromide, and the like.

Although the invention is not to be limited thereby, the following examples will illustrate how the present invention may be practiced.

EXAMPLE I

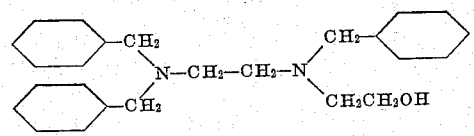

300 grams (5 moles) of ethylenediamine were charged into a 1-liter autoclave. The autoclave was closed and heated to 100° C. and into it were pumped (at 15 lbs. pressure) for a period of 5 hours a total of 44 grams (1 mole) of ethylene oxide. After all the ethylene oxide was added, the material was stirred at 100° C. for 1 hour. The end of the reaction was determined when the pressure of the ethylene oxide fell no lower. The autoclave was opened and the material discharged. The product was fractionally distilled through a 16-inch column of glass helices and the first (and major) product distilled was ethylene diamine boiling at 117° C. at atmospheric pressure. When no more ethylenediamine distilled, the product remaining was essentially aminoethyl ethanolamine.

To a 1-liter, 3-necked flask were added 104.0 grams of aminoethyl ethanolamine, 300 mls. of benzene, and 30 mls. of distilled water. The 2-phase mixture was heated to 60° C. Into this mixture were dripped during a ½ hour period 57 grams of benzyl chloride, while keeping the temperature between 60° C. and 65° C. The material was stirred for 5 hours at 60–65° C. After 3 hours, the pH was taken by withdrawing a small sample, slurrying it with water, and measuring the pH with a pH meter. The pH was 9.6 and 2 hours later the pH was still constant at 9.6. The material was then cooled to 50° C. and 17.5 grams of sodium hydroxide pellets added. The mixture was stirred until the caustic dissolved; the pH, measured as above, became 11.35.

A second portion of 57 grams of benzyl chloride was dripped in over ½ hour period. It was stirred until the pH, as measured above, became constant, which required 3½ hours. A second portion of 17.5 grams of sodium hydroxide pellets was added. The mixture was stirred for ½ hour until all the sodium hydroxide had reacted and the pH became constant at 11.5.

A third portion of 57 grams of benzyl chloride was added over a 15 minute period and the mixture stirred for 4 hours. A corresponding third portion of 17.5 grams of sodium hydroxide pellets was then added and the mixture stirred for 2 hours until the pH became 10.8.

A fourth portion of 57 grams of benzyl chloride was added in 15 minutes and the mixture heated for 4 hours. An addition of 17 grams of sodium hydroxide pellets was then made over a 20 minute period. The mixture was stirred for 1 hour until the pH became 10.6.

A fifth portion of benzyl chloride was added over a 1-hour period at 60° C. and the mixture stirred for 4 hours. When the pH of the withdrawn aliquots became constant, there were added 17 grams of sodium hydroxide pellets. After dissolving the sodium hydroxide pellets, which required ½ hour of stirring, a sixth portion of 93 grams of benzyl chloride was dripped in over a 2-hour period, and the mixture stirred 3 hours. 200 mls. of water and 60 mls. of 40% sodium hydroxide were added and the mixture thoroughly shaken and the layers separated. The upper benzene layer was then distilled at atmospheric pressure to a top temperature of 135° C. and the benzene removed. The remaining material which weighed 379 grams was the desired product in crude form and was purified by distillation at reduced pressure.

EXAMPLE II

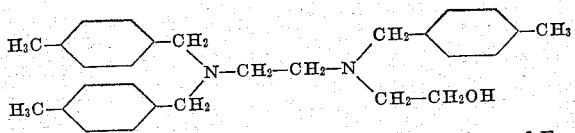

This compound was prepared by the procedure of Example I with the exception that the 5 portions of 57 grams of benzyl chloride were replaced by 6 portions of 65 grams of p-tolylbenzylchloride. The final portion of 93 grams of benzyl chloride was replaced by 102 grams of p-tolylbenzyl chloride.

EXAMPLE III

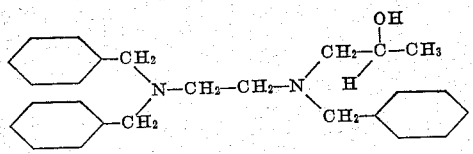

300 grams (5 moles) of ethylenediamine were charged into a 1-liter autoclave. The autoclave was closed and heated to 100° C. and into it were pumped (at 15 lbs. pressure) for a period of 5 hours a total of 58 grams of 1,2-propylene oxide. After all the 1,2-propylene oxide was added, the material was stirred at 100° C. for 1 hour. The end of the reaction was determined when the pressure of the 1,2-propylene oxide fell no lower. The autoclave was opened and the material discharged. The product was fractionally distilled through a 16-inch column of glass helices and the first (and major) product distilled was ethylenediamine boiling at 117° C. at atmospheric pressure. When no more ethylenediamine distilled, the product remaining was essentially aminoethyl isopropanolamine.

The benzylation thereof to give the compound characterized by the above formula was carried out in the same manner as that described in Example I except that 104.0 grams of aminoethyl ethanolamine were replaced by 116 grams of aminoethyl isopropanolamine prepared as above.

EXAMPLE IV

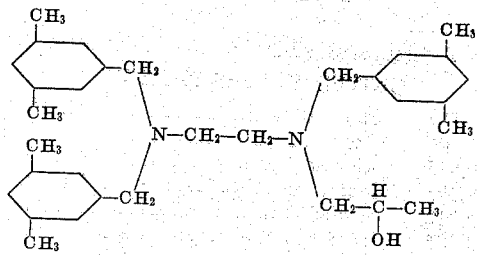

Example I was repeated with the exception that 104.0 grams of aminoethyl ethanolamine were replaced by 116 grams of aminoethyl isopropanolamine, and the five 57-gram portions of benzyl chloride were replaced by six 70-gram portions of 3,5-dimethylbenzyl chloride. The sixth portion of 96 grams of benzyl chloride was replaced by 117 grams of 3,5-dimethylbenzyl chloride.

In connection with the foregoing examples, it is important to note that the benzyl halide be added in small portions and that after each added portion has reacted, sufficient base be added to convert the amine hydrohalide to free amine. After each portion is neutralized, another fraction of benzyl halide is added, allowed to react completely, then treated with base. It is not necessary that the base used be sodium hydroxide, since anhydrous sodium carbonate or other bases such as lime may be used as well. The small amount of water present is required to dissolve the base to permit neutralization of the hydrohalide formed. This method of benzylating diamines is more successful and gives much better yields than any method of forming benzyl derivatives which is reported in current literature. The success in preparing these compounds with practically no formation of quaternary ammonium chloride is only possible as a result of this technique.

In the presence of an excess of an acid binding agent like sodium carbonate, triethanolamine, and the like, which would not react appreciably with benzyl halide, it is also possible to get the reaction to proceed efficiently. It is absolutely essential that the hydroxy alkyl alkylene diamine be benzylated in the form of the free base and not be a partial hydrochloride or hydrobromide since it does not come into contact with the benzyl halide as the partial hydrohalide but either precipitates out of the benzene layer or dissolves in the water phase.

EXAMPLE V 1.6 grams of the reaction product of Example I were mixed with .4 gram of the condensation product of isoamyl phenol and 10 moles (calculated) of ethylene oxide, prepared according to United States Patent 1,932,180. This mixture was then added to 5000 parts of warm water at 50° C., and 100 parts of cellulose acetate silk cloth, which had been previously dyed with 1,4-di-(monomethylamino)-anthraquinone (0.6% on weight of cloth), were introduced into the resulting bath. The silk was worked while gradually raising the temperature to 80° C. and then for an additional ½ hour to 1 hour. Upon completion of the operation the cellulose acetate silk was removed, washed with dilute soap and water, rinsed with water, and dried. The blue color of the treated material had much better resistance to acid fumes than cloth not after-treated with the new compound.

EXAMPLE VI

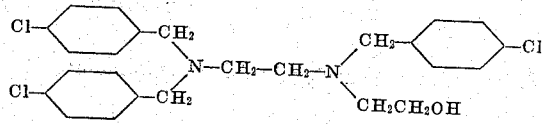

Example I was repeated with the exception that an equimolar amount of p-chlorobenzyl chloride was employed in place of benzyl chloride.

EXAMPLE VII

*Preparation of spirit-soluble dye from monazo pyrazolone*

35.8 grams of 1-[4'-sulfo phenyl]-3-methyl-4-phenyl-azo-5-pyrazolone were slurried with 500 mls. of water and treated with 20 mls. of concentrated hydrochloric acid. The sodium salt of the azo pyrazolone was converted by this procedure into the insoluble, free acid form. The precipitate was filtered off and washed with water. The press-cake was then sucked down sharply, removed from the funnel and reslurried with 500 mls. of acetone. To the acetone slurry were added 37.6 grams of the reaction product of Example I. The acetone-dye-amine slurry was refluxed at 55° C. for 2 hours, after which the acetone was distilled off and the product dried to yield the dye characterized by the following structure:

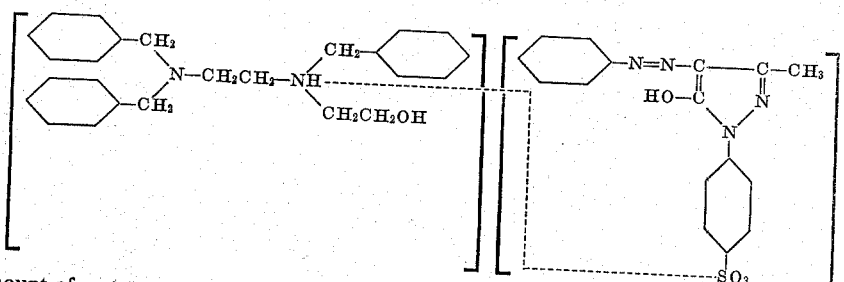

The above product is far more soluble in nitrocellulose lacquer solvents (alcohol, acetone, methyl ethyl ketone, toluene, etc.) than is the sodium salt of the dye.

Materials other than those mentioned may be used with the anti-acid faders in question, i. e., fibers or fabrics containing a cellulose ester, such as cellulose formate, cellulose propionate, cellulose butyrate, cellulose-acetate-propionate, cellulose-acetate-butyrate, or cellulose ethers, such as cellulose methyl ether, cellulose ethyl ether, cellulose benzyl ether and the like. Accordingly, we do not intend to be limited in the patent granted except as necessitated by the appended claims.

We claim:

1. N,N,N'-tribenzyl-N'-hydroxy alkyl aliphatic diamines characterized by the following general formula:

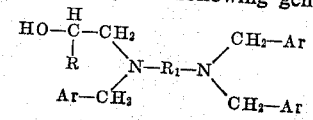

wherein R represents a member selected from the class consisting of hydrogen and methyl, R₁ represents an alkylene radical of from 2 to 6 carbon atoms, and Ar represents a radical selected from the class consisting of phenyl, mono-halo phenyl and lower alkyl substituted phenyl.

2. The compound having the following formula:

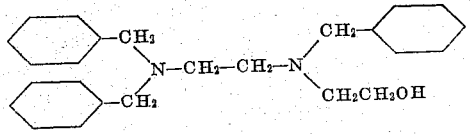

3. The compound having the following formula:

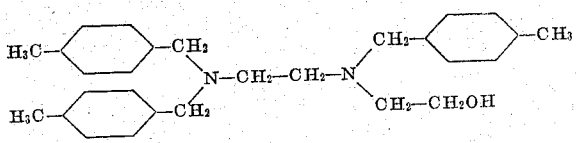

4. The compound having the following formula:

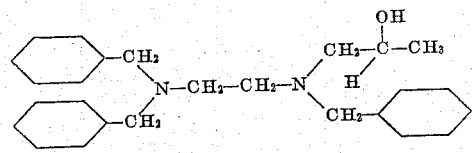

5. The compound having the following formula:

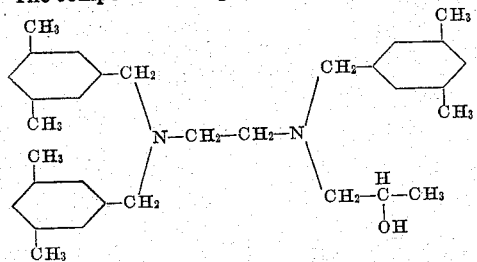

6. The compound having the following formula:

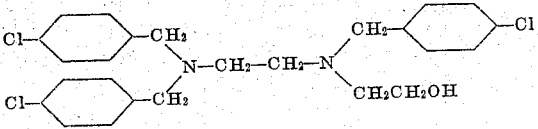

References Cited in the file of this patent

UNITED STATES PATENTS

| | | |
|---|---|---|
| 2,017,119 | Holland et al. | Oct. 15, 1935 |
| 2,256,806 | Kern | Sept. 23, 1941 |
| 2,490,835 | Rieveschl et al. | Dec. 13, 1949 |
| 2,518,393 | Smith | Aug. 8, 1950 |
| 2,539,212 | Strobel et al. | Jan. 23, 1951 |
| 2,573,605 | Rieveschl et al. | Oct. 30, 1951 |

OTHER REFERENCES

Nickerson et al.: "Jour. of Pharm. and Exp. Therapeutics," vol. 97 (1949), pp. 25–47.